United States Patent [19]

Lin

[11] Patent Number: 5,708,306

[45] Date of Patent: Jan. 13, 1998

[54] SUPPLEMENTARY POWER SYSTEM OF AN AUTOMOBILE

[76] Inventor: Chion-Dong Lin, No. 12-6, Tien-Hsin Lane, Ya-Tan Rd., Ta-Ya Hsiang, Taichung Hsien, Taiwan

[21] Appl. No.: 803,253

[22] Filed: Feb. 20, 1997

[51] Int. Cl.$^6$ .................................................. F01K 23/00
[52] U.S. Cl. ................................................ 307/10.1; 60/618
[58] Field of Search ............................... 307/9.1, 10.1; 60/604, 618, 597, 606, 613, 616

[56] References Cited

U.S. PATENT DOCUMENTS 4,300,353  11/1981  Ridgway ........................... 60/618
5,339,632   8/1994  McCrabb et al. ................... 60/618

Primary Examiner—Richard T. Elms
Attorney, Agent, or Firm—Morton J. Rosenberg; David L Klein; Jun Y. Lee

[57] ABSTRACT

A supplementary power system of an automobile, including a plurality of pre-heating water chambers and a steam boiler connected in series, a water circulation loop for collecting heat from the engine cooling system of the automobile for warming up water in the pre-heating water chambers, an exhaust gas guide pipe for collecting heat from the exhaust gas of the engine for heating water in the steam boiler into steam, a steam engine driven by steam from the steam boiler, an air compressor driven by the steam engine, and a pneumatic motor driven by the air compressor to transmit a driving power to the engine shaft of the automobile through a transmission belt.

2 Claims, 2 Drawing Sheets

1

SUPPLEMENTARY POWER SYSTEM OF AN AUTOMOBILE

BACKGROUND OF THE INVENTION

The present invention relates to a supplementary power system for an automobile which collects heat from the engine cooling system and the engine exhaust system for heating water into steam for driving a pneumatic motor, permitting the output power of the pneumatic motor to be transmitted to the engine shaft by a transmission belt.

In order to increase the power of an automobile, two methods may be employed. One method is to increase the capacity of the oil valves, so that much fuel mixture can be ejected into the engine for burning. However, this method simultaneously increases the burden of the engine, thereby causing the service life of the engine to be shortened. The other method is to improve the combustion rate by accurately controlling the fuel air ratio. However, this method can only fully utilize fuel oil. Further, during the operation of the engine of an automobile, a big amount of hot exhaust gas is produced and expelled into the air. The heat of exhaust gas from motor vehicles will cause a greenhouse effect to the environment.

SUMMARY OF THE INVENTION

It is one object of the present invention to provide a supplementary power system for an automobile which collects heat from the engine cooling system of the automobile for warning up water, permitting it to be further heated into steam for converting into motor power. It is another object of the present invention to provide a supplementary power system for an automobile which collects heat from the engine exhaust system of the automobile to heat water into steam, and then converts steam into motor power for accelerating the engine shaft. It is still another object of the present invention to provide a supplementary power system for an automobile which collects heat from the automobile to prevent it from causing a greenhouse effect to the environment.

According to the preferred embodiment of the present invention, the supplementary power system is installed in an automobile to add a driving power to the engine shaft of the automobile, comprising: a water reservoir; a plurality of pre-heating water chambers connected in series to the water reservoir to receive water from the water reservoir; a steam boiler connected in series to the pre-heating water chambers to heat water from the pre-heating water chambers to the boiling point; a water level controller; a plurality of one-way electromagnetic valves controlled by the water level controller to open the water passage between the water reservoir and the pre-heating water chambers respectively; a water circulation loop connected to the engine cooling system of the automobile and passing through the pre-heating water chambers, for circulation of engine cooling water through the pre-heating water chambers, permitting water in the pre-heating water chambers to be warmed up by heat carried in water in the engine cooling water; an exhaust gas guide pipe connected between the engine exhaust system and muffler of the automobile, and passing through the steam boiler and one pre-heating water chamber, for permitting water in the steam boiler to be heated to the boiling point by heat from the exhaust gas of the engine of the automobile; a steam engine driven by steam from the steam boiler; an air compressor driven by the steam engine; a pneumatic motor driven by the air compressor and having a power output end coupled to the engine shaft of the automobile by a transmission belt; and a steam recovery container adapted for collecting exhaust steam from the steam engine and guiding it to the water reservoir.

DETAILED DESCRIPTION OF THE PREFERRED EMBODIMENT

Figure 1:
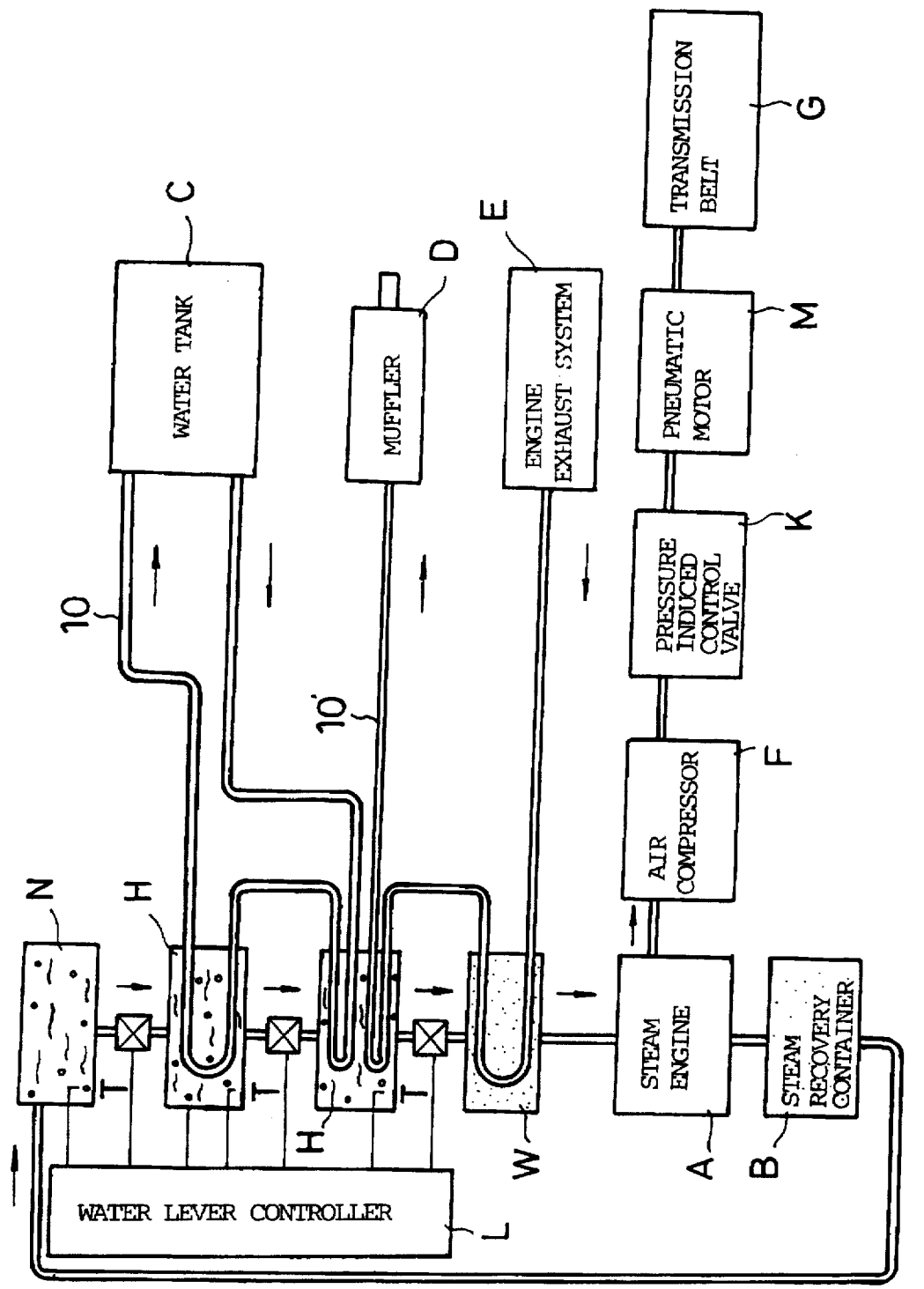
FIG. 1 is a system block diagram of a supplementary power system according to the present invention.
Figure 2:
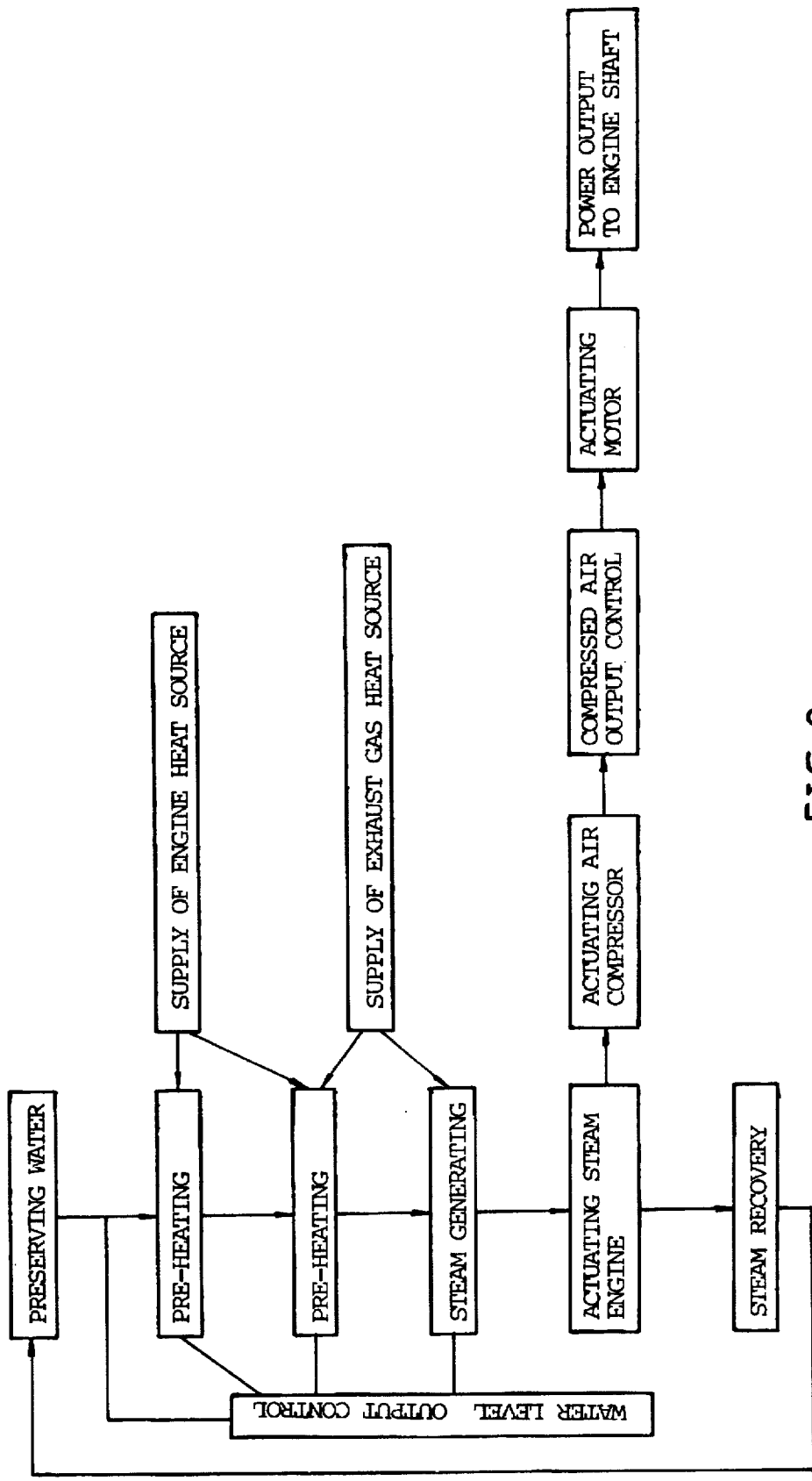
FIG. 2 is an operating flow chart showing the operation flow of the supplementary power system according to the present invention.

Referring to FIGS. 1 and 2, a supplementary power system in accordance with the present invention is generally comprised of a water reservoir N, a plurality of pre-heating water chambers H, a plurality of one-way electromagnetic valves T, a steam boiler W, a steam engine A, an air compressor F, a pneumatic motor M, a steam recovery container B, and a pressure-induced control valve K. The water reservoir N, the pre-heating water chambers H and the steam boiler W are connected to one in series by a water pipe system. The one-way electromagnetic valves T are connected in parallel between the water pipe system and a water level controller L. The electromagnetic valves T are controlled by the water level controller L to close/open the pre-heating water chambers H respectively. A water circulation loop 10 is connected to the engine cooling system (for example, the water tank) C of the automobile and passes through the pre-heating water chambers H, for circulation of engine cooling water through the pre-heating water chambers H. An exhaust gas guide pipe 10' is connected between the engine exhaust system E and muffler D of the automobile, and passes through the steam boiler W and the adjacent pre-heating water chamber H. The steam boiler W has an output port connected to the input port of the steam engine A, therefore the stem engine A is driven by steam from the steam boiler W. The power output port of the steam engine A is connected to the air compressor F, enabling the air compressor F to drive the pneumatic motor M. The power output end of the pneumatic motor M is coupled to the engine shaft of the engine of the automobile by a transmission belt G. Exhaust steam from the steam engine A is collected by the steam recovery container B, and then delivered back to the water reservoir N. The pressure-induced control valve K detects the pressure of the air compressor F. When the pressure of the air compressor F reaches a predetermined value, the pressure-induced control valve K immediately opens the passage between the air compressor F and the pneumatic motor M, permitting the pneumatic motor M to be turned on. When the accelerator of the automobile is stepped on after the pneumatic motor M is turned on, the output power of the pneumatic motor M is immediately transmitted to the engine shaft of the automobile through the transmission belt G.

The operation of the present invention is outlined hereinafter with reference to FIGS. 1 and 2 again. The water reservoir N, the pre-heating water chambers H and the steam boiler W respectively contain a predetermined volume of water. When the engine of the automobile is operated, engine heat is carried to the water tank of the engine cooling system C for cooling. Hot water from the water tank is simultaneously circulated through the water circulation loop 10, causing water in the pre-heating water chambers H to be pre-warmed. At the same time, exhaust gas from engine exhaust system E is guided to the muffler D through the exhaust gas guide pipe 10'. When hot exhaust gas passes through the exhaust gas guide pipe 10', water in the respective pre-heating water chamber H and the steam boiler W is gradually heated to the boiling point. Steam from the steam boiler W is then guided to the steam engine A, causing the steam engine A to drive the air compressor F, enabling the air compressor F to move the pneumatic motor M. The output power of the pneumatic motor M is then transmitted to the engine shaft of the automobile through the transmission belt G.

When no air pressure is provided from the air compressor F to the pneumatic motor M, the pneumatic motor M will run idle. However, because the motor M is a pneumatic motor, it causes little friction force (below 50 kilograms) when running idle. Therefore, little resisting force is produced by the pneumatic motor against the rotation of the engine shaft when the air compressor F provides no air pressure to the pneumatic motor M. Because the pressure-induced control valve K is mounted between the air compressor F and the pneumatic motor M, when the pressure of the air compressor F surpasses a predetermined value, the pressure-inducted control valve K is opened to let compressed air pass from the air compressor F to the pneumatic motor M, causing the pneumatic motor M to be moved. The rotary power of the pneumatic motor M is then transmitted through the transmission belt G to the engine shaft, and therefore the output power of the engine shaft is enhanced. For example, if the engine power is 3000 kgs, and the rotary power of the pneumatic motor M is 300 kgs, the output power of the engine shaft will be 3000+300=3300 kgs. The installation of the water level controller L and the one-way electromagnetic valves T enables the water level of the pre-heating water chambers H to be automatically controlled. Further, because the steam recovery container B collects exhaust steam for repeated use, the supplementary power system consumes only a small amount of water.

It is to be understood that the drawings are designed for purposes of illustration only, and are not intended as a definition of the limits and scope of the invention disclosed.

What the invention claimed is:

1. A supplementary power system installed in an automobile to add a driving power to the engine shaft of the automobile, comprising:

a water reservoir;

a plurality of pre-heating water chambers connected in series to said water reservoir to receive water from said water reservoir;

a steam boiler connected in series to said pre-heating water chambers to heat water from said pre-heating water chambers to the boiling point;

a water level controller;

a plurality of one-way electromagnetic valves controlled by said water level controller to open the water passage between said water reservoir and said pre-heating water chambers respectively;

a water circulation loop connected to the engine cooling system of the automobile and passing through said pre-heating water chambers, for circulation of engine cooling water through said pre-heating water chambers, permitting water in said pre-heating water chambers to be warmed up by heat carried in water in the engine cooling water;

an exhaust gas guide pipe connected between the engine exhaust system and muffler of the automobile, and passing through said steam boiler and one pre-heating water chamber, for permitting water in said steam boiler to be heated to the boiling point by heat from the exhaust gas of the engine of the automobile;

a steam engine driven by steam from said steam boiler;

an air compressor driven by said steam engine;

a pneumatic motor driven by said air compressor and having a power output end coupled to the engine shaft of the automobile by a transmission belt; and a steam recovery container adapted for collecting exhaust steam from said steam engine and guiding it to said water reservoir.

2. The supplementary power system of claim 1 further comprising a pressure-induced control valve mounted between said air compressor and said pneumatic motor, said pressure-induced control valve being opened to let compressed air pass from said air compressor to said pneumatic motor when the pressure of air of said air compressor surpasses a predetermined value.

\* \* \* \* \*